(12) United States Patent
Zamir

(10) Patent No.: US 10,108,434 B2
(45) Date of Patent: Oct. 23, 2018

(54) BOOTING A COMPUTING DEVICE BY STREAMING A DESKTOP IMAGE OVER A NETWORK

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 231 days.

(21) Appl. No.: 14/852,470

(22) Filed: Sep. 11, 2015

(65) Prior Publication Data

US 2017/0075698 A1 Mar. 16, 2017

(51) Int. Cl.
G06F 3/06 (2006.01)
G06F 11/00 (2006.01)
H04L 29/08 (2006.01)
G06F 9/4401 (2018.01)
H04L 29/06 (2006.01)

(52) U.S. Cl.
CPC ............ G06F 9/4416 (2013.01); G06F 3/065 (2013.01); G06F 3/0619 (2013.01); G06F 3/0689 (2013.01); G06F 11/00 (2013.01); H04L 65/60 (2013.01); H04L 67/06 (2013.01); H04L 67/34 (2013.01)

(58) Field of Classification Search
CPC ............ H04L 29/12235; G06F 3/0662; G06F 9/4401; G06F 9/4406; G06F 9/4408; G06F 9/4411; G06F 9/4416; H04N 21/443
See application file for complete search history.

(56) References Cited

U.S. PATENT DOCUMENTS

| | | | | |
|---|---|---|---|---|
| 8,843,650 B2* | 9/2014 | Song | ...................... | G06F 21/575 709/229 |
| 2003/0126242 A1* | 7/2003 | Chang | ................... | G06F 9/4416 709/222 |
| 2006/0170763 A1* | 8/2006 | Kawamura | ............ | H04N 7/147 348/14.09 |
| 2008/0155075 A1* | 6/2008 | Cromer | ................. | G06F 9/4416 709/222 |
| 2009/0172082 A1* | 7/2009 | Sufuentes | ............. | G06F 21/128 709/203 |
| 2011/0276620 A1* | 11/2011 | Pirzada | ................... | G06F 3/061 709/203 |
| 2011/0320799 A1* | 12/2011 | Lam | ......................... | G06F 8/63 713/2 |
| 2014/0129819 A1* | 5/2014 | Huang | .................. | G06F 9/4416 713/2 |
| 2014/0372744 A1* | 12/2014 | Xu | ........................ | G06F 9/4416 713/2 |

* cited by examiner

*Primary Examiner* — Edward Kim

(57) ABSTRACT

A system is described for replacing the desktop image on a computing device with a network-based desktop image (e.g., a backup copy of a desktop image) while allowing the user to resume working on the computing device with the new desktop with minimal downtime. The computing device is booted directly from the backed-up desktop image on the network. After boot, the system allows the user to use the computing device with the new desktop image by directing read requests for information that is only available on the network to the desktop image on the network. Write operations are performed on the local disk of the computing device. While the user is using the computing device, the desktop image is streamed in the background and stored on the local disk.

20 Claims, 7 Drawing Sheets

BOOTING A COMPUTING DEVICE BY STREAMING A DESKTOP IMAGE OVER A NETWORK

TECHNICAL FIELD

The present disclosure generally relates to managing computing devices and more specifically to replacing a desktop image and booting a computing device over a network.

BACKGROUND

In today's enterprise environments, remote management of computing devices on the enterprise network is increasingly commonplace. The information technology (IT) departments of organizations are able to perform numerous tasks on user devices on the network quickly, efficiently, and in an automated and cost-effective manner by having remote access to devices via a network. For example, the IT department can update, replace, or fix applications or operating systems on user devices by remotely accessing the user devices and transmitting any needed files over the network. However, numerous difficulties still persist.

For example, the process of replacing a desktop image on a user device (e.g., with a backup desktop image) still presents numerous difficulties and inconveniences to both the user and the IT department. There are many cases in which IT may need to replace the desktop image installed on a user's physical device. For example, a user's laptop may have been broken or stolen and the user received a new laptop onto which the user's desktop image needs to be placed. The user may have upgraded to a new desktop or laptop, requiring the user's desktop image to be placed onto the new desktop or laptop. The user's desktop image may need to be replaced because the computing device is not functioning properly (e.g. the system crashes). In these cases and others, IT would like to reduce the user down time to the bare minimum and to allow the user to quickly get back to work on the machine. However, current desktop re-imaging solutions usually require several hours or days to complete the re-imaging process. Throughout this period of time, the user must stay connected to the network and usually cannot make productive use of the computing device.

Generally, traditional solutions require that the entire image is copied to the target machine before the user can use the machine. These solutions take a long time to deploy the image (e.g., the process can consume several hours for a real-world user image). Examples of such solutions include Ghost by Symantec Corporation and True Image by Acronis International GmbH. Other solutions use streaming technology and require the entire disk image to be streamed before the user can use the machine offline, which is not practical in real-world scenarios.

More recent solutions, such as Mirage by VMware, Inc., allow a user to begin using the computing device before the entire desktop image is replaced by first downloading a small version of an operating system and critical applications so that the user is able to start using the computing device while the remaining files are transferred. However, while these approaches are superior in many respects to solutions that require full image transfer before the device can be used, the user still has to wait for the small version of the operating system and critical applications to be downloaded before she can resume work, which, depending on the available resources, can consume a significant amount of time. Further, such solutions generally require multiple phases to implement as the computing device is first booted with the small version of the operating system and then booted again once the desktop image is replaced.

A more efficient approach is desirable for replacing desktop images on user devices on enterprise networks.

DETAILED DESCRIPTION

Figure 1:
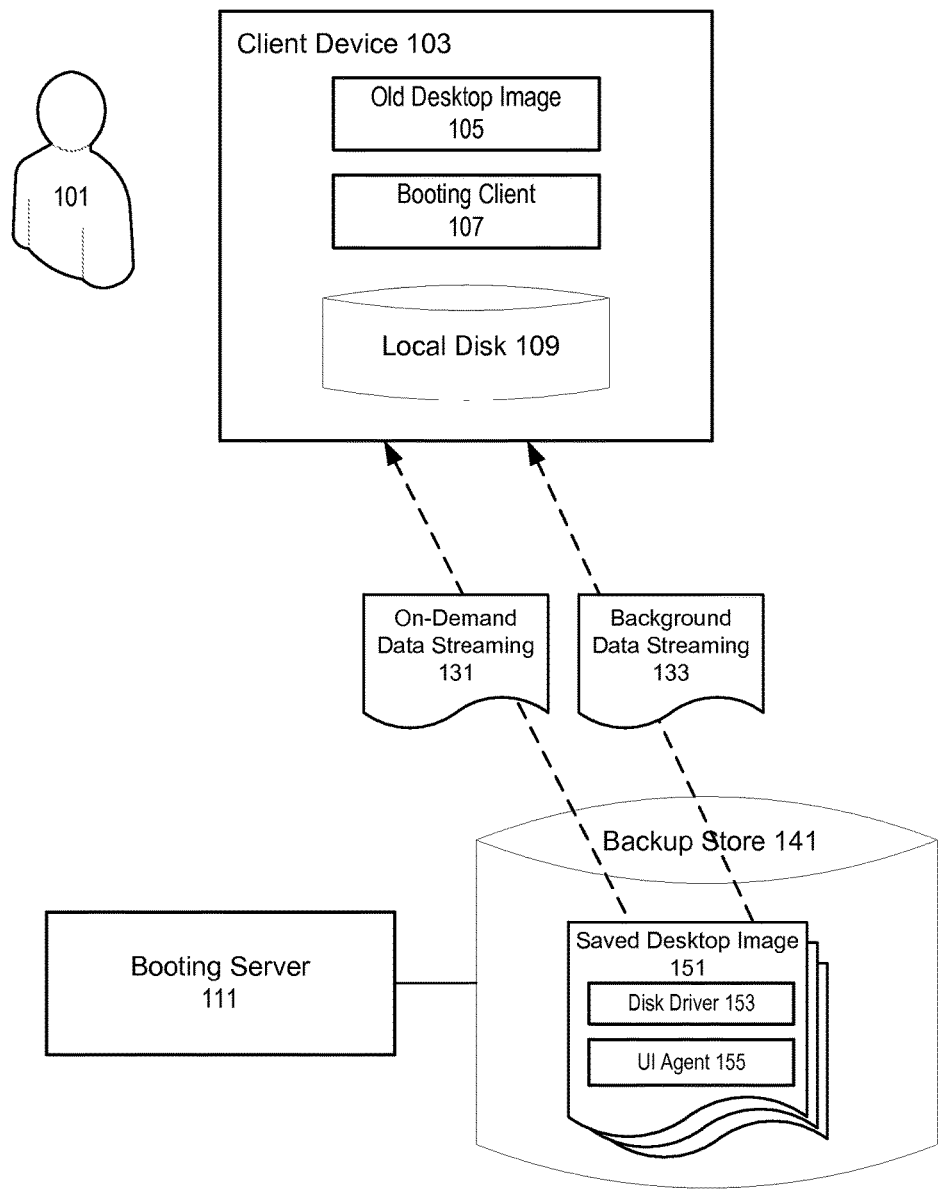
FIG. 1 illustrates an example architecture of a system for replacing a desktop image on a computing device, in accordance with various embodiments.

Systems and methods in accordance with various embodiments of the present disclosure overcome at least some of the above mentioned shortcomings and deficiencies by providing a more efficient way for replacing a desktop image on a computing device while minimizing the downtime for the user.

As mentioned above, in various scenarios, it may be necessary to replace a desktop image on a computing device with another desktop image. For example, the desktop image on a user's computing device may need to be replaced with a backup copy of the user's desktop image, which may be stored on a remote server. This might be required as a result of the user acquiring a new laptop onto which the user's desktop image needs to be placed, to repair a computing device by returning it to a previous state, or for a number of other reasons. Conventionally, a user would generally be unable to use her computing device for an extended period of time while the desktop re-imaging process takes place.

In various embodiments, to replace a desktop image on a computing device with a saved desktop image, the computing device is booted directly from a network disk containing the saved desktop image. For example, the network disk may be a read-only disk available over a network such as a WAN, LAN, or the Internet and the saved desktop image may be a backup copy of a user's desktop image. Subsequently, any calls by the operating system ("OS") of the computing device that are directed to content that is on the network disk are sent to the network disk and the requested data is transmitted to the computing device, where it can be used by the computing device to perform operations. The requested content can also be stored on a local disk of the computing device and subsequent calls to the content can be fetched locally. Writes by the OS are similarly recorded on the local disk of the computing device. Concurrently, in the background, the system streams the saved desktop image to the computing device, where it is also stored on the local disk. Once the entire saved desktop image is downloaded, the computing device can be used as a regular machine.

Accordingly, the user is able to start using the computing device and access the entire saved desktop image almost immediately after the system is booted, without having to wait for the entire saved desktop image or any significant portion of it to be downloaded first. For example, a user who acquires a new "blank" laptop may be able to boot the laptop and almost instantly access her old desktop on the laptop.

Further, in various embodiments, the system can organize the content of the saved desktop image by level of importance and the order in which the content is downloaded to the computing device in the background can be based on the importance level of the corresponding content. For example, the system can identify critical files and frequently used files. Because the system may need the critical files to function and boot properly, those files can be downloaded first. Subsequently, the frequently used files can be downloaded so that, if the user has to use the computing device offline, she would still have access to the most frequently used content.

A user interface object, such as a window on the screen of the computer device, can notify the user of the status of the image replacement. For example, before all critical files are downloaded, the user can be notified not to disconnect the computing device from the network or that the system is not ready for offline use. If the user disconnects from the network in this state, the system may shut down. Subsequently, as the frequently used files and the remaining files are downloaded, the system can notify the user when the computing device is ready for different levels of use (e.g., basic offline use, most offline use, full offline use, etc.)

As used herein, "desktop image" (or just "image") refers to data and executables that comprise substantially the entire content that is stored at a computing device, including the operating system (OS), applications, configuration and settings, as well as all user data and files. For example, in some embodiments, a desktop image includes all files that are stored on one or more physical storage devices (e.g., such as hard disks or solid state storage devices) in a computing device. In other embodiments a desktop image includes all files that are stored on one or more physical storage devices in a computing device, except files that are temporary or transient in nature and that do not need to be centrally managed.

According to the techniques described herein, a desktop image includes a collection of files that store data in compressed or non-compressed form, and the data may be unformatted (e.g., binary data, raw disk blocks, raw data partitions, etc.) or structured as various types of files (e.g., data files, DLL files, executable files, personal user files of various file types, various types of configuration files, etc.) and/or any other type of data structure format.

As used herein, "streaming" a desktop image refers to transferring or otherwise transmitting the desktop image files in a sequence over one or more networks.

FIG. 1 illustrates an example architecture of a system for replacing a desktop image on a computing device, in accordance with various embodiments. As illustrated in the example of FIG. 1, the system contains a client device 103 assigned to a user 101. The client device 103 can be any computing device such as a laptop, desktop computer, tablet, etc. In various embodiments, the client device 103 can be part of an enterprise network where numerous client devices (e.g., 103) are centrally managed by an IT department.

The client device 103 may contain an old desktop image 105 that the system will replace with a saved desktop image 151, located in a backup store 141. In various embodiments, the saved desktop image 151 can be a backup copy of a desktop associated with the user 101, which the user 101 wants to be placed on the client device 103. For example, the saved desktop image 151 may have been backed up from a different computing device of the user 101 (other than client device 103) and the user 101 would now like to place the saved desktop image 151 on the client device 103 (e.g., the client device 103 might be a new "blank" computing device). Alternatively, the saved desktop image 151 may have been backed up from the client device 103 at a previous time and the user would now like to place the saved desktop image 151 onto the client device 103 to revert the client device 103 to a previous state (e.g., due to the client device 103 malfunctioning).

In various embodiments, the backup store 141 is located on a remote server for purposes of backing up computing devices (e.g., 103) on the enterprises network. Accordingly, the backup store 141 can contain desktop images (e.g., 151) for numerous client devices (e.g., 103) on the network and the desktop images (e.g., 151) can be continuously updated (i.e., backed up) to maintain a current version of each user's (e.g., 101) desktop. In addition, old versions of desktop images (e.g., 151) can be saved, e.g., to allow a system to be returned to a previous state when needed.

To begin the re-imaging process, the client device 103 can be booted directly from the saved desktop image 151 in the backup store 141 such that the operating system behaves as if it is booting from a local disk, while it is actually booting from a remote disk. This can be performed via a booting client 107 in the client device 103 that communicates with a booting server 111. Communication between the booting server 111, the backup store 141, and the client device 103 can be over a network, such as the Internet.

In various embodiments, the client device 103 can be booted directly from the desktop image 151 by instructing the Basic Input/Output System (BIOS) of the client device 103 to boot directly from the network-based desktop image 151. For example, this can be performed implementing standard technology, such as the Preboot eXecution Environment (PXE) boot. In this embodiment, the booting client 107 can be a PXE client and the server 111 can be a PXE server. Communication between the PXE client and the PXE server can be through the Internet Small Computer Systems Interface (iSCSI) protocol. Hence, during boot time, the BIOS can be instructed to boot from the saved desktop image 151 using the PXE technology. For example, on various Windows machines, this can be achieved by pressing the F12 key during boot time. A PXE address of the PXE server can be received at the client device 103. The client device 103 can receive boot code from the PXE server and execute the boot code to perform the boot.

After the client device 103 is booted, a disk driver 153 in the desktop image 151 intercepts disk write requests generated by the client device 103 OS and redirects them to a physical local disk 109 in the client device 103, such that the corresponding data is written to the local disk 109 (e.g., instead of being transmitted over the network to the backup store 141).

In various embodiments, when data is requested by the client device 103 OS, the disk driver 153 intercepts such request and determines whether the requested data is available in the local disk 109 (e.g., due to it already having been downloaded or written to the local disk 109) or whether it is only available in the desktop image 151. Subsequently, if the data is only available in the desktop image 151, the disk driver 153 can direct the read request to the desktop image 151 in the backup store 141 and the requested data can be streamed "on-demand" 131 to the client device 103. If the data is available in the local disk 109, then the disk driver 153 can direct the request to the local disk 109. In various embodiments, the on-demand streamed data 131 can be stored in the local disk 109, for example, so that the data does not need to be streamed again during the re-imaging process and so that subsequent calls to the data can be fetched locally.

Further, the contents of the desktop image 151 can be continuously streamed in the background 133 to the client device 103 to ensure that the entire desktop image 151 is eventually transferred to the local disk 109 of the client device 103.

In various embodiments, the disk driver 153 can contain a mapping indicating which content is available on the local disk 109. Based on the mapping, the disk driver 153 can determine whether to direct a read request to the local disk 109 or to the desktop image 151. The mapping can be continuously updated as the desktop image 151 is streamed from the backup store 141 to the local disk 109 and as data is written to the local disk 109. Hence, the disk driver 153 can use the mapping to determine when requested content should be retrieved from the local disk 109 and when it is only available in the backup store 141. Further, the disk driver 153 can use this mapping to determine which content should be streamed during the background streaming 133, for example, to avoid redundant streaming of data that is already available on the local disk 109 (e.g., if the data was previously streamed on-demand 131).

In various embodiments, the disk driver 153 works at the block level and contains a mapping indicating which blocks of the desktop image 151 have been downloaded to the local disk 109. Further, the mapping may indicate which blocks are used by files of the desktop image 151 and what space is free. Hence, in a Windows system, the system only streams blocks that belong to either the master file table or to a file; it does not stream any unused blocks from the desktop image 151. For example, the desktop image 151 may be 100 GB, only 30 GB of which might be used by files of the image 151 while the remaining 70 GB is free. Based on the mapping, the system can stream only the 30 GB that are used by the image 151.

In various embodiments, because a backup desktop image (e.g., 151) might not contain a disk driver 153 when it is initially created, the disk driver 153 can be injected into the desktop image 151 by the system. For example, the disk driver 153 can be injected at the beginning of the booting process; that is, when the server 111 detects an instruction to boot from the desktop image 151, the system can automatically inject the disk driver 153 into the desktop image 151. In a Windows system, when the desktop image 151 is in a raw format (i.e., in the same format as originally stored on the hard disk of the physical device from which the desktop image 151 was generated), the disk driver 153 can be injected by mounting the desktop image 151, obtaining read/write access to the file system of the image 151, and modifying the desktop image 151 by adding the relevant disk driver 153 files into their corresponding places and entering registry settings. In this fashion, the disk driver 153 is loaded early on in the booting process.

In various embodiments, the order in which the contents of the desktop image 151 are streamed to the client device 103 can be based on the relative importance or priority of the contents. In various embodiments, the importance or priority of the content can be based on how critical the content is for offline operation of the client device 103 and/or on how necessary the content is to the user 101. For example, files that are of higher importance can be streamed before files of lower importance. In various embodiments, the desktop image 153 can be separated into numerous categories based on the priority of the contents. Subsequently, contents in higher priority categories are streamed prior to contents in lower priority categories.

Further, the user 101 can be notified, such as through a message on the user interface of the computing device 103, when certain categories of files have been downloaded, to indicate the progress as well as to let the user know what scope of functionality may be available if the computing device 103 is disconnected from the network. For example, a user interface ("UI") agent 155 in the desktop image 151 can produce a user interface element, such as a dialog box or window, where messages can be communicated to the user 101 regarding the progress of the image replacement and/or regarding what functionality is available for offline use. In various embodiments, because a backup desktop image (e.g., 151) might not contain a UI agent 155 when the image is initially created, the UI agent 155 can be injected into the desktop image 151 in the same way that the disk driver 153 is injected, as described above.

As described above, the system can split the desktop image 151 into various categories based on the importance or priority of the content. In an embodiment, the desktop image 151 can be split into the following categories: critical files, frequently used files, and all other files. The system can detect readiness for offline use based on which categories of content have been downloaded and the status can be communicated to the user 101 via the UI agent 155.

For example, before the critical files are downloaded, the system state might be "not ready for offline use" because if the user disconnects from the network in this state, the system might shut down. Accordingly, the UI agent 155 may display a message such as "not ready for offline use" or "do not disconnect" on the display of the client device 103. After the critical files are downloaded, the system is in a "ready for basic offline use" state. At this point, if the user disconnects from the network, she can use the OS but many of her frequently used applications might not work. Accordingly, the UI agent 155 may display a message such as "ready for basic offline use".

After the frequently used files have been downloaded, the system state might be "ready for most offline use". If the user disconnects from the network in this state, she can use the OS and most of her frequently used applications and data, however, some rarely accessed applications and data will not be available. Accordingly, the UI agent 155 may display a message such as "ready for most offline use". Subsequently, after all other files are downloaded, the system is in a "ready for full offline use" state. At this point, the user can freely disconnect from the network because all data has been downloaded. Similarly, the UI agent 155 may display a message such as "ready for full offline use".

Numerous methods can be used to separate desktop image 151 contents into categories, such as critical files, frequently used files, and all other files. For example, critical files and frequently used files can be identified by monitoring a computing device running with the desktop image 151. This can be performed as part of the backup process in which the desktop image 151 is generated. Hence, each backup desktop image (e.g., 151), when created, can have a corresponding listing or mapping created that separates the contents of the desktop image (e.g., 151) into categories.

In various embodiments, to identify critical files, the corresponding computing device can be monitored (e.g., via a file monitor in the OS that monitors file accesses) to identify which files and/or data are being accessed by the OS at boot time or until some predetermined point in the process or point in time. For example, the critical files can include all content (files and data) accessed until the logon time, or until the logon time plus ten minutes. Further, some specific files and directories that are known to be critical (e.g., Windows registry files in a Windows system) can be included in the critical files by the system in addition to files identified by monitoring. For example, such lists may be located in predetermined locations, such as c:\windows\system32\drivers\ in a Windows system or they can be compiled by the IT department and included in the critical files category.

Similarly, to identify the frequently used files, the system can be monitored to identify which files and data are access during a predetermined interval of time. For example, a file monitor can track which applications, files, and data are accessed during the first 15 minutes after login. The identified applications, files, and data can then be included in the "frequently used files" category. After the critical files and frequently used files categories are identified, the remaining content of the desktop image 151 can be placed in the "all other files" category.

Accordingly, to provide status notifications to the user, the UI agent 155 can determine when each category of files has been downloaded based on the created lists of critical files, frequently used files, and all other files and the UI agent can produce corresponding notifications upon completion of downloading of each category, as described above (e.g., to let the user know about offline readiness).

The process of separating a desktop image into categories is further described in U.S. Pat. No. 8,639,917 B1 of Ben-Shaul et al and U.S. Pat. No. 8,112,505 B1 of Ben-Shaul et al, which are incorporated herein by reference.

In various embodiments, a desktop image in a backup store may be stored in a non-raw disk format (i.e., not in the same format as originally stored on the hard disk of the physical device from which the desktop image was generated) but instead in a different format, which may be compressed, proprietary, containing special headers, and so on. An example of such a proprietary storage format is a single instance store ("SIS").

A SIS is a de-duplicated storage located in an enterprise (typically on a server) where desktop images of user machines are stored, e.g., for backup purposes. The single instance store de-duplicates the stored desktop images such that only one copy of a given file needs to be stored. For example, numerous desktop images can contain pointers to the single copy of the file in the SIS instead of containing duplicate copies of the file. Thus, unique desktop files only need to be stored once in the de-duplicated SIS, dramatically cutting storage costs. Further, an agent that runs on each desktop periodically uploads incremental file changes into the SIS as part of an ongoing backup/synchronization process. Accordingly, an up-to-date desktop image of each user's desktop can be constantly kept in the SIS. An example of a product that implements such a SIS is Mirage by VMware, Inc.

However, when booting directly from a desktop image, the process may fail (e.g., BIOS may be unable to interpret the desktop image) if the desktop image is not in a raw disk image format. Namely, the desktop image should appear as a raw disk backup image (like the blocks of the disk in the physical device originally). To solve this problem, when the desktop image is stored in a non-raw format (e.g., in a SIS), a synthetic disk may be used to make the desktop image appear to the system as a raw desktop image, avoiding the need to convert the desktop image into a raw format, which can consume resources and time. In various embodiments, the synthetic disk can be a read-only storage acting as a temporary container that re-directs file read accesses into corresponding blocks in the backup store where the desktop image is stored, while appearing to the client device as a raw desktop image.

Figure 2:
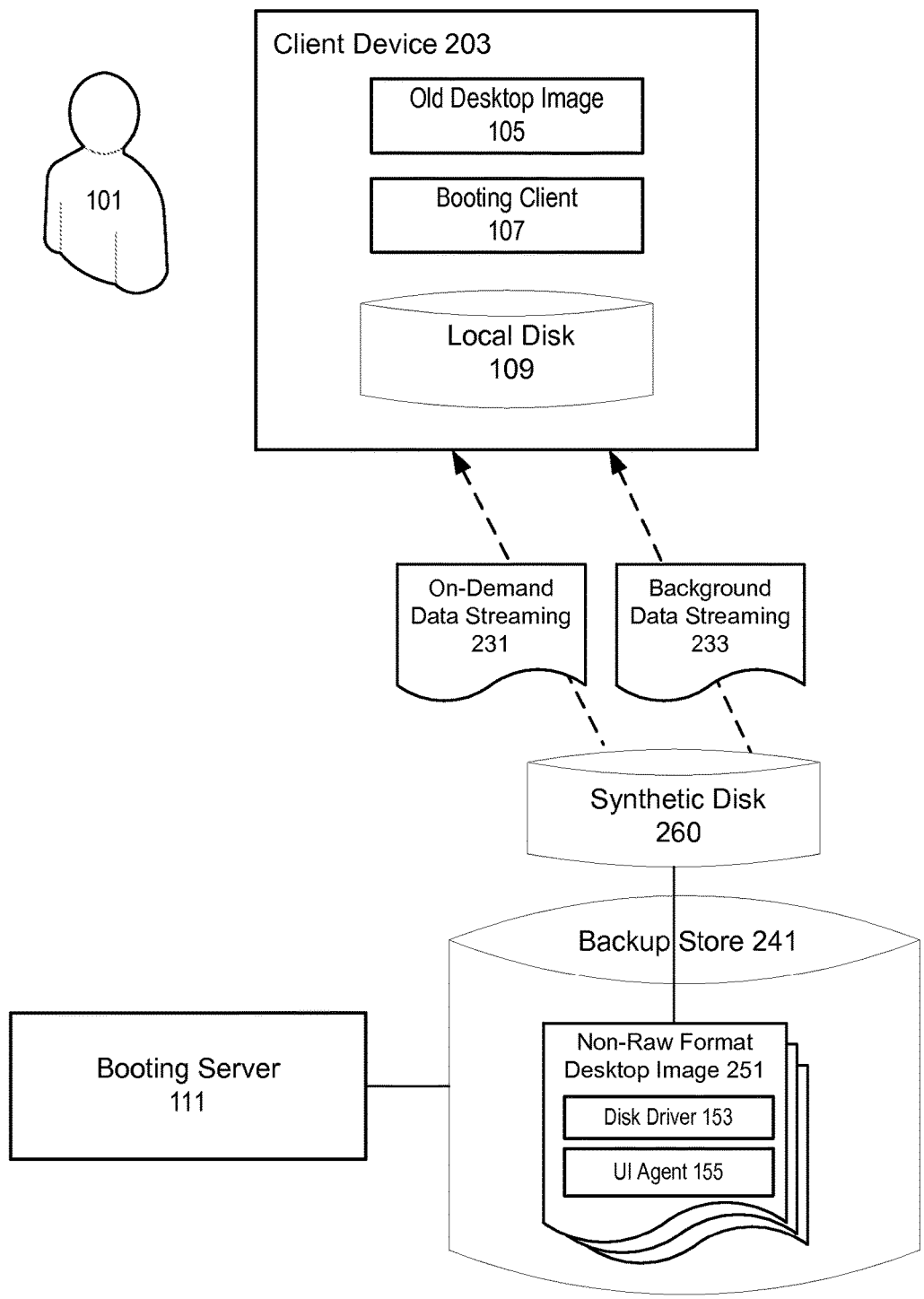
FIG. 2 illustrates an example architecture of a system for replacing a desktop image on a computing device utilizing a synthetic disk, in accordance with various embodiments.

FIG. 2 illustrates an example architecture of a system for replacing a desktop image on a computing device utilizing a synthetic disk, in accordance with various embodiments. Except as described below, the components illustrated in the example of FIG. 2 can function analogously to the corresponding components illustrated in the example of FIG. 1. As illustrated in the example of FIG. 2, a backup store 241 contains a non-raw format desktop image 251. For example, the backup store 241 may store desktop images (e.g., 251) in a SIS. To permit the system to boot from the image 251, a synthetic disk 260 is initialized on top of the desktop image 251. In various embodiments, the synthetic disk 260 is a temporary storage container located on the server. The synthetic disk 260 is configured to appear to the system as a raw-format disk so that the system is able to boot directly from the synthetic disk 260 as if it were a standard disk.

In various embodiments, the synthetic disk 260 may itself contain minimal data and function primarily to re-direct read requests from the client device 203 OS to corresponding blocks in the backup store 241 where the desktop image 251 is stored, while appearing to the client device 203 as a raw desktop image. For example, read requests associated with on-demand streaming 231 and/or background streaming 233 can be received at the synthetic disk and redirected to the corresponding locations in the backup store 241 so that the requested data can be retrieved and delivered to the client device 203. In various embodiments, to enable the system to boot, the synthetic disk 260 may also contain various data that is critical for proper booting of the system.

Figure 3:
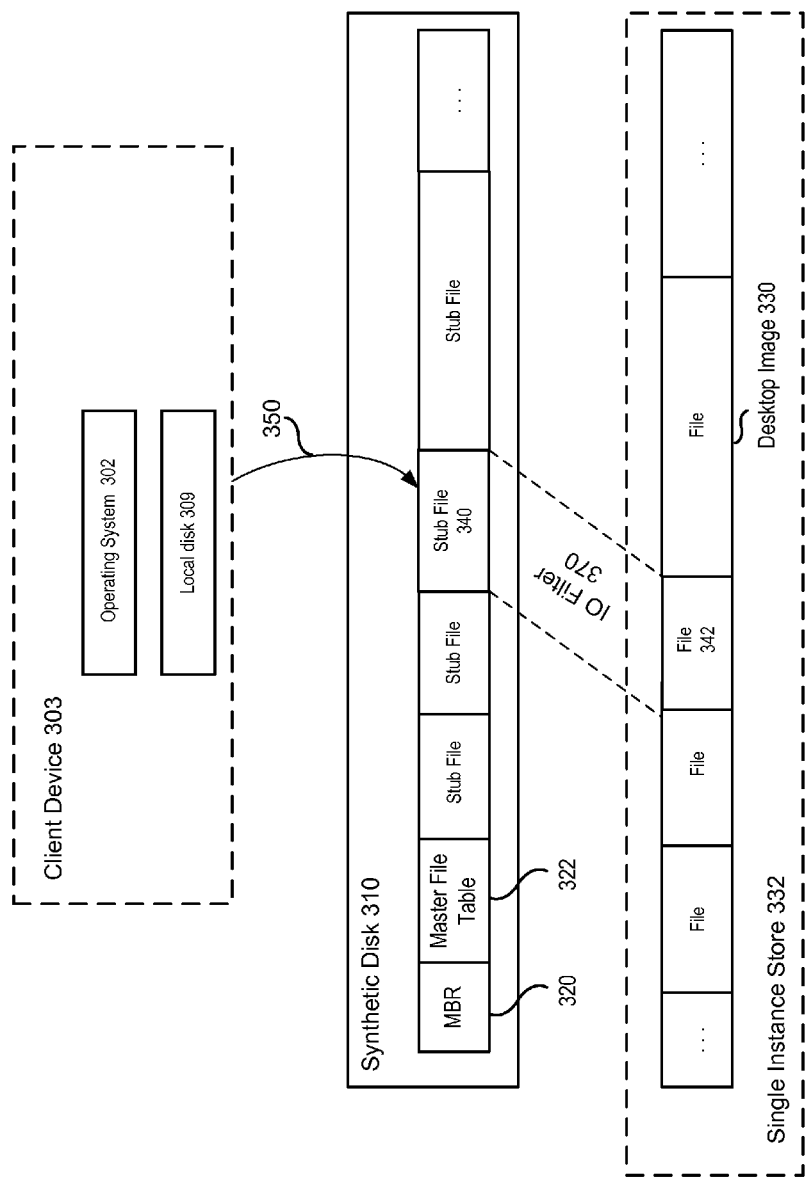
FIG. 3 illustrates a detailed view of a synthetic disk in a system for desktop image replacement, in accordance with various embodiments.

FIG. 3 illustrates a detailed view of a synthetic disk in a system for desktop image replacement, in accordance with various embodiments. As illustrated in the example of FIG. 3, client device 303 contains an operating system 302 and a local disk 309. A read-only synthetic disk 310 is set up that acts as a stub disk by redirecting read requests from the OS 302 to a single instance store 332 where a desktop image 330 is stored.

To enable the system to boot, the synthetic disk 310 contains data that is critical for proper booting of the system. For example, the first sector on the disk can contain a Master Boot Record (MBR) 320. In the case of booting a Windows desktop, this will be the MBR of the Windows operating system. The MBR 320 also contains a partition table defining the disk partitions of the desktop image. In the case of a Windows desktop, the synthetic disk 310 will contain at least one VMS partition. The NITS partition contains a NITS Master File Table (MET) 322. For each file in the desktop image 330, a stub file is created in the synthetic disk 310 in the corresponding partition. For example, stub file 340 is created in the synthetic disk 310 for file 342 of the desktop image 330.

In various embodiments, the re-direction function can be performed by a disk input-output (I/O) filter 370 that intercepts read requests from the OS 302 to the synthetic disk 310 and redirects the read requests to the SIS 332. For example, when a read request 350 for block 340 in the synthetic disk 310 is made, the filter 370 instantly determines into which SIS 332 file block 342 of the desktop image 330 the request should be redirected (if at all) and redirects the request. The filter 370 makes the determination based on a mapping relating the synthetic disk 310 to the desktop image 330 in the SIS 332.

The synthetic disk 310 is only used for read access. The local disk 309 enables write access. When the OS 302 writes a block, the block gets written to the local disk 309 and therefore any subsequent accesses to this block can be fetched locally from the local disk 309.

Figure 4:
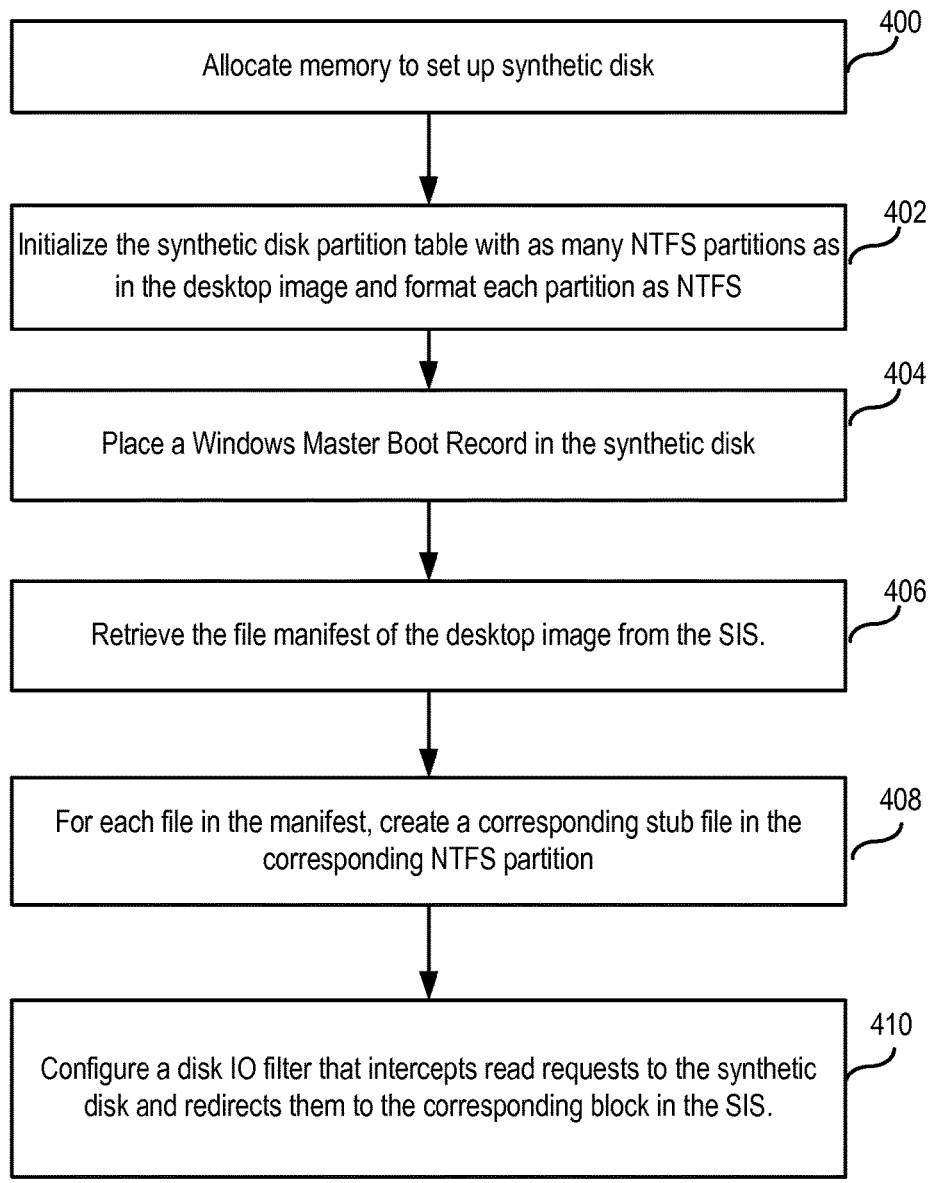
FIG. 4 illustrates a process flow for building a synthetic disk in a Windows environment, in accordance with various embodiments.

FIG. 4 illustrates a process flow for building a synthetic disk in a Windows environment, in accordance with various embodiments. Memory is allocated to set up the synthetic disk in operation 400. The synthetic disk's partition table is initialized with as many NTFS partitions as in the desktop image and each partition is formatted as NTFS, as shown in operation 402. A Windows Master Boot Record is placed in the synthetic disk (operation 404) to enable the system to boot. In operation 406, the file manifest of the desktop image is retrieved from the SIS. For each file in the manifest, a corresponding stub file is created in the corresponding NTFS partition, as shown in operation 408, with the correct file size and with all the other file meta-information (e.g. security information, timestamps, etc.) as in the manifest. This step only performs updates on the Master File Table (MFT) of the NTFS file-system and doesn't place any data in the created files. The synthetic disk is for read only access. Afterwards, a disk IO filter is configured to intercept read requests to the synthetic disk and redirects them to the corresponding block in the SIS in operation 410.

In various embodiments, the IO filter can redirect read requests based on a mapping of the synthetic disk blocks into their corresponding SIS file blocks. Such a mapping can be a by-product of the synthetic disk build process. For example, the mapping can be obtained by parsing the generated NTFS MFT and collecting the addresses of disk blocks allocated for each file.

Thus, when a read request for a block in offset X is made, the filter instantly determines into which SIS file block the request should be redirected (if at all). A simplistic and fast data structure that can be used to efficiently perform this real-time mapping is a table that maps a disk block offset into a corresponding SIS file index and the offset within that file.

As will be apparent to one skilled in the art, while the example of FIG. 4 illustrates the process for building a synthetic disk in a Windows environment, an analogous process can be implemented for other non-Windows systems.

Figure 5:
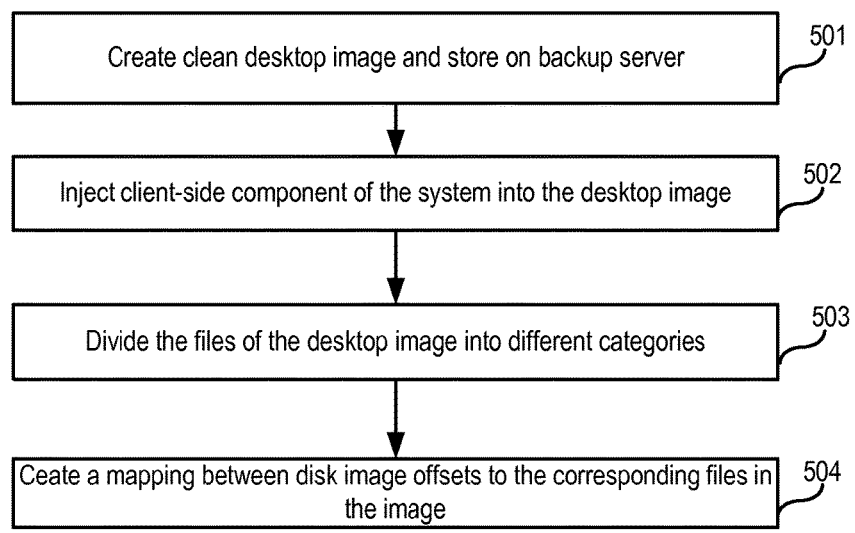
FIG. 5 illustrates a process flow for back-end desktop image preparation in a system for desktop image replacement, in accordance with various embodiments.

FIG. 5 illustrates a process flow for back-end desktop image preparation in a system for desktop image replacement, in accordance with various embodiments. In operation 501, a clean desktop image is created and stored on a backup server of the system. For example, the desktop image can be created by backing up a client device. In some embodiments, the desktop image can be stored in a raw format. In other embodiments, the desktop image can be stored in a non-raw format, such as in a SIS, in which case the system can set up a synthetic disk as described above. In operation 502, the system injects the client-side component of the system into the desktop image, including the disk driver and the UI agent. In an embodiment, the client-side component can be injected automatically when the system detects an instruction to boot a client device directly from the desktop image. In another embodiment, the client-side component can be injected at another time, before the system detects an instruction to boot a client device directly from the desktop image. In operation 503, the system divides the files of the desktop image into different categories (e.g., critical files, frequently used files, other files), as described above. In operation 504, the system creates a mapping between disk image offsets to the corresponding files in the image so that the system can later track which files have been downloaded throughout the re-imaging process.

Figure 6:
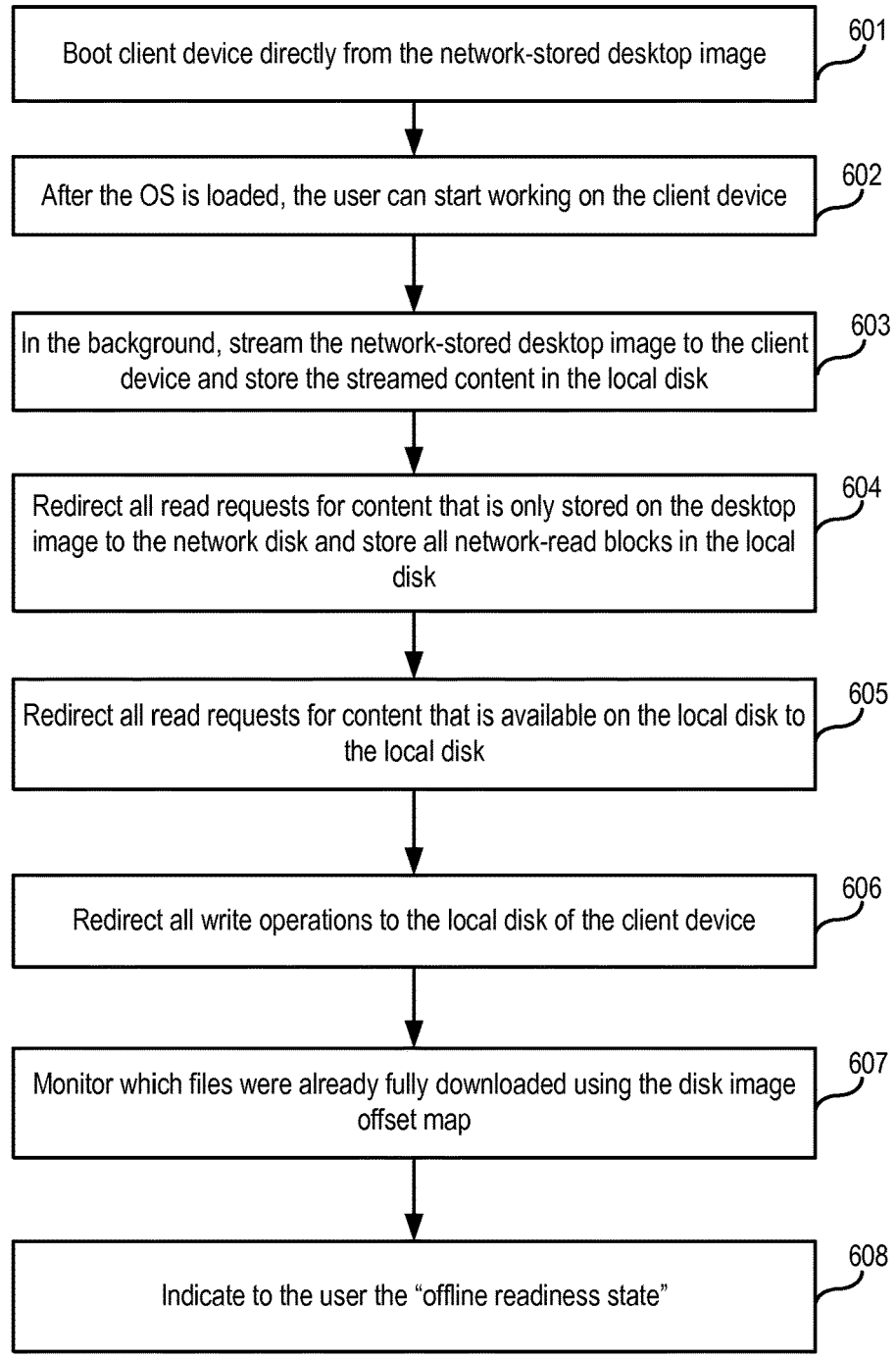
FIG. 6 illustrates a process flow for replacement of a desktop image on a client device with a prepared desktop image stored on a network, in accordance with various embodiments.

FIG. 6 illustrates a process flow for replacement of a desktop image on a client device with a prepared desktop image stored on a network, in accordance with various embodiments. In operation 601, the client device is booted directly from the network-stored desktop image (to clarify, if the desktop image is not stored in a raw format, then the system can boot from a synthetic disk that re-directs read requests to the appropriate locations on the network disk). For example, in a Windows system, the user can perform the boot by booting the physical machine and instructing the BIOS to boot from the network (using the F12 key, in most systems). Subsequently, the BIOS receives a PXE server address from the Dynamic Host Configuration Protocol (DHCP) server and runs the boot code from the PXE server. The boot code then loads Windows from a remote iSCSI disk image.

In operation 602, after the OS is loaded, the user can start working on the client device. In operation 603, the system streams, in the background, the network-stored desktop image to the client device and stores the streamed content in the local disk. In operation 604, the disk driver redirects all read requests for content that is only stored on the desktop image to the network disk and stores all network-read blocks in the local disk. In operation 605, the disk driver redirects all read requests for content that is available on the local disk to the local disk. In operation 606, the disk driver redirects all write operations to the local disk of the client device. In operation 607, the client-side component monitors which files were already fully downloaded using the disk image offset map prepared in advance on the server side (see step 504 in FIG. 5). Based on this information, the UI agent indicates to the user the "offline readiness state" in operation 608, as described in more detail above. For example, the UI agent can indicate whether the system is "not ready for offline use", "ready for basic offline use", "ready for most offline use", or "ready for full offline use".

Figure 7:
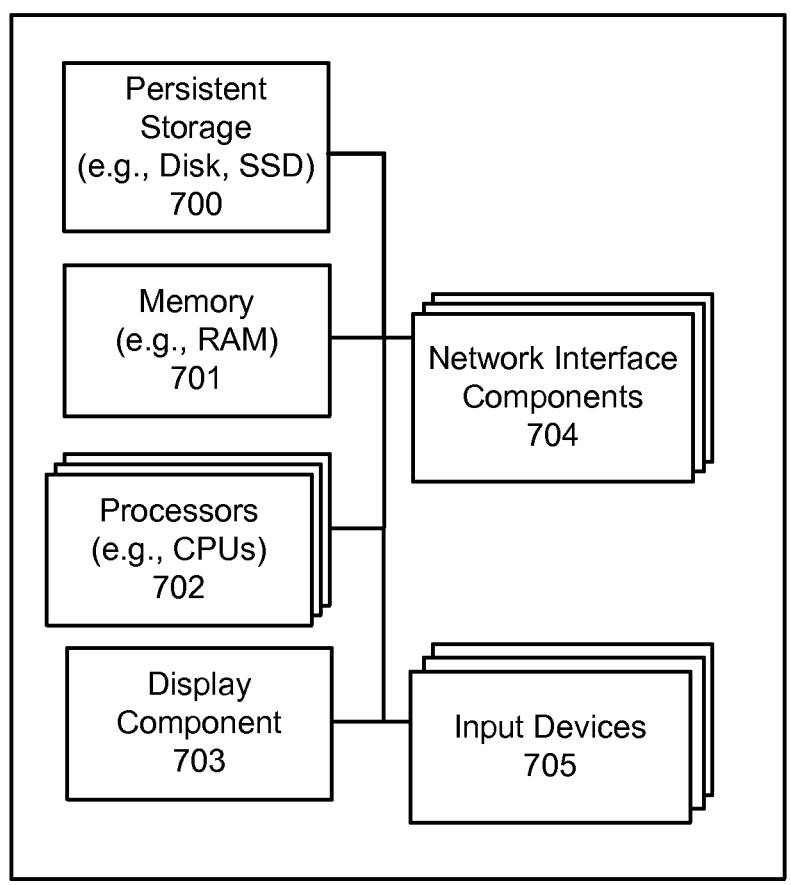
FIG. 7 illustrates an example of some general components of a computing device that can be utilized in conjunction with various embodiments described in the present specification.

FIG. 7 illustrates an example of some general components of a computing device that can be utilized in conjunction with various embodiments described in the present specification. In this particular example, the computing device includes one or more processors (e.g., central processing units (CPUs) 702 for executing instructions that can be stored in a storage medium. The storage medium may take the form of memory 701 (e.g., RAM), persistent storage 700 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 702, a separate form of storage for images or data, a removable memory for sharing information with other devices and the like.

The computing device typically further comprises a display component 703, such as a computer monitor, a touch screen, liquid crystal display (LCD), light-emitting diode (LED) display, or the like. The display component 703 is conventionally used to display images or information to the user so that the user may interact with the computing device. In various embodiments, the computing device will also include a set of input devices 705 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 704 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for downloading a desktop image from a remote server onto a computing device and allowing the computing device to run from the desktop image during the download, comprising:
    booting the computing device from the desktop image on the remote server;
    initiating a process of streaming content of the desktop image to the computing device from the remote server and storing the streamed content on a local disk on the computing device;
    allowing the computing device to run from the desktop image during the desktop image download by:
        directing write requests from an operating system in the desktop image to the local disk on the computing device and writing the corresponding data to the local disk;
        directing read requests from the operating system that are targeted to information that is available on the local disk to the local disk and retrieving the requested information from the local disk; and
        directing read requests from the operating system that are targeted to information that is only available on the desktop image on the remote server to the desktop image on the remote server, retrieving the requested information from the desktop image on the remote server, storing the information retrieved from the remote server on the local disk, and directing subsequent requests for the information retrieved from the remote server to the local disk instead of the remote server.

2. The method of claim 1, further comprising:
injecting a disk driver into the operating system of the desktop image, wherein the disk driver contains a mapping of which content of the desktop image is present on the local disk, and wherein the disk driver directs the read request to the local disk when the call is targeted to information that is available on the local disk, and wherein the disk driver directs the read request to the desktop image on the remote server when the call is targeted to information that is only available on the desktop image.

3. The method of claim 1, further comprising:
separating the contents of the desktop image into categories based on the priority of the contents, wherein higher priority content is streamed to the computing device before lower priority content.

4. The method of claim 1, further comprising:
identifying a portion of the desktop image corresponding to a set of critical files, wherein the critical files correspond to files that need to be downloaded to the computing device before it is ready for offline use; and
streaming the critical files to the computing device prior to other contents of the desktop image.

5. The method of claim 4, further comprising:
identifying a portion of the desktop image corresponding to a set of frequently used files, wherein the frequently used files are determined based on the files that are accessed on the computing device during a predetermined period of time after the system is booted; and
streaming the frequently used files to the computing device after the critical files but prior to other contents of the desktop image.

6. The method of claim 1, wherein the read requests are transmitted to a synthetic disk that redirects the read requests to corresponding locations in the desktop image, wherein the synthetic disk is configured to appear to the operating system as a raw data disk.

7. The method of claim 1, wherein booting the computing device further comprises:
receiving a preboot execution environment (PXE) address of the remote server by the computing device;
receiving boot code from the remote server and executing the boot code by the computing device;
loading the operating system by the boot code on the computing device over a network interface from the remote server, the operating system including a disk driver, wherein the disk driver is configured to monitor which files of the desktop image have completed streaming to the computing device and which files are still located on the remote server.

8. A system for downloading a desktop image from a remote server onto a computing device and allowing the computing device to run from the desktop image during the download, comprising:
at least one processor; and
memory including instructions that, when executed by the at least one processor, cause the system to:
boot the computing device from the desktop image on the remote server;
initiate a process of streaming content of the desktop image to the computing device from the remote server and store the streamed content on a local disk on the computing device;
allow the computing device to run from the desktop image during the desktop image download by:
directing write requests from an operating system in the desktop image to the local disk on the computing device and writing the corresponding data to the local disk;
directing read requests from the operating system that are targeted to information that is available on the local disk to the local disk and retrieving the requested information from the local disk; and
directing read requests from the operating system that are targeted to information that is only available on the desktop image on the remote server to the desktop image on the remote server, retrieving the requested information from the desktop image on the remote server, storing the information retrieved from the remote server on the local disk, and directing subsequent requests for the information retrieved from the remote server to the local disk instead of the remote server.

9. The system of claim 8, wherein the memory further includes instructions that when executed by the at least one processor, cause the computing device to:
inject a disk driver into the operating system of the desktop image, wherein the disk driver contains a mapping of which content of the desktop image is present on the local disk, and wherein the disk driver directs the read request to the local disk when the call is targeted to information that is available on the local disk, and wherein the disk driver directs the read request to the desktop image on the remote server when the call is targeted to information that is only available on the desktop image.

10. The system of claim 8, wherein the memory further includes instructions that when executed by the at least one processor, cause the computing device to:
separate the contents of the desktop image into categories based on the priority of the contents, wherein higher priority content is streamed to the computing device before lower priority content.

11. The system of claim 8, wherein the memory further includes instructions that when executed by the at least one processor, cause the computing device to:
identify a portion of the desktop image corresponding to a set of critical files, wherein the critical files correspond to files that need to be downloaded to the computing device before it is ready for offline use; and
stream the critical files to the computing device prior to other contents of the desktop image.

12. The system of claim 11, wherein the memory further includes instructions that when executed by the at least one processor, cause the computing device to:
identify a portion of the desktop image corresponding to a set of frequently used files, wherein the frequently used files are determined based on the files that are accessed on the computing device during a predetermined period of time after the system is booted; and
stream the frequently used files to the computing device after the critical files but prior to other contents of the desktop image.

13. The system of claim 8, wherein the read requests are transmitted to a synthetic disk that redirects the read requests to corresponding locations in the desktop image, wherein the synthetic disk is configured to appear to the operating system as a raw data disk.

14. The system of claim 8, wherein booting the computing device further comprises:
receiving a preboot execution environment (PXE) address of the remote server by the computing device;
receiving boot code from the remote server and executing the boot code by the computing device;
loading the operating system by the boot code on the computing device over a network interface from the remote server, the operating system including a disk driver, wherein the disk driver is configured to monitor which files of the desktop image have completed streaming to the computing device and which files are still located on the remote server.

15. A non-transitory computer readable storage medium for downloading a desktop image from a remote server onto a computing device and allowing the computing device to run from the desktop image during the download, comprising one or more sequences of instructions, the instructions when executed by one or more processors causing the one or more processors to execute the operations of:
booting the computing device from the desktop image on the remote server;
initiating a process of streaming content of the desktop image to the computing device from the remote server and storing the streamed content on a local disk on the computing device;
allowing the computing device to run from the desktop image during the desktop image download by:
directing write requests from an operating system in the desktop image to the local disk on the computing device and writing the corresponding data to the local disk;
directing read requests from the operating system that are targeted to information that is available on the local disk to the local disk and retrieving the requested information from the local disk; and
directing read requests from the operating system that are targeted to information that is only available on the desktop image on the remote server to the desktop image on the remote server, retrieving the requested information from the desktop image on the remote server, storing the information retrieved from the remote server on the local disk, and directing subsequent requests for the information retrieved from the remote server to the local disk instead of the remote server.

16. The non-transitory computer readable storage medium of claim 15, further comprising instructions to cause the one or more processors to execute the operations of:
injecting a disk driver into the operating system of the desktop image, wherein the disk driver contains a mapping of which content of the desktop image is present on the local disk, and wherein the disk driver directs the read request to the local disk when the call is targeted to information that is available on the local disk, and wherein the disk driver directs the read request to the desktop image on the remote server when the call is targeted to information that is only available on the desktop image.

17. The non-transitory computer readable storage medium of claim 15, further comprising instructions to cause the one or more processors to execute the operations of:
separating the contents of the desktop image into categories based on the priority of the contents, wherein higher priority content is streamed to the computing device before lower priority content.

18. The non-transitory computer readable storage medium of claim 15, further comprising instructions to cause the one or more processors to execute the operations of:
identifying a portion of the desktop image corresponding to a set of critical files, wherein the critical files correspond to files that need to be downloaded to the computing device before it is ready for offline use; and
streaming the critical files to the computing device prior to other contents of the desktop image.

19. The non-transitory computer readable storage medium of claim 18, further comprising instructions to cause the one or more processors to execute the operations of:
identifying a portion of the desktop image corresponding to a set of frequently used files, wherein the frequently used files are determined based on the files that are accessed on the computing device during a predetermined period of time after the system is booted; and
streaming the frequently used files to the computing device after the critical files but prior to other contents of the desktop image.

20. The non-transitory computer readable storage medium of claim 15, wherein the read requests are transmitted to a synthetic disk that redirects the read requests to corresponding locations in the desktop image, wherein the synthetic disk is configured to appear to the operating system as a raw data disk.

* * * * *